(12) United States Patent
Nishimura

(10) Patent No.: US 12,292,113 B2
(45) Date of Patent: May 6, 2025

(54) GASKET

(71) Applicant: KABUSHIKI KAISHA TOYOTA JIDOSHOKKI, Kariya (JP)

(72) Inventor: Keisuke Nishimura, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/561,521

(22) PCT Filed: Apr. 22, 2022

(86) PCT No.: PCT/JP2022/018568
§ 371 (c)(1),
(2) Date: Nov. 16, 2023

(87) PCT Pub. No.: WO2022/244596
PCT Pub. Date: Nov. 24, 2022

(65) Prior Publication Data
US 2024/0229736 A1      Jul. 11, 2024

(30) Foreign Application Priority Data
May 19, 2021   (JP) .................................. 2021-084492

(51) Int. Cl.
*F16J 15/08*     (2006.01)
*F02F 11/00*     (2006.01)

(52) U.S. Cl.
CPC ......... *F16J 15/0825* (2013.01); *F02F 11/002* (2013.01)

(58) Field of Classification Search
CPC ............... F16J 15/0825; F16J 2015/085; F16J 2015/0862; F02F 11/002
(Continued)

(56) References Cited

U.S. PATENT DOCUMENTS 5,695,200 A * 12/1997 Diez .................... F16J 15/0825
                                                                277/593
5,713,580 A *  2/1998 Ueta .................... F16J 15/0825
                                                                277/593
(Continued)

FOREIGN PATENT DOCUMENTS

DE        199 50 410 A1      5/2001
EP         1 248 024 A2     10/2002
(Continued)

OTHER PUBLICATIONS

International Search Report for PCT/JP2022/018568 dated Jun. 14, 2022.

*Primary Examiner* — Nicholas L Foster
(74) *Attorney, Agent, or Firm* — Sughrue Mion, PLLC

(57) ABSTRACT

A first plate portion abuts against a cylinder head and has a substantially constant plate thickness. A second plate portion abuts against a cylinder block and has a substantially constant plate thickness. An intermediate plate portion is sandwiched between the first plate portion and the second plate portion and has a substantially constant plate thickness. A shim is sandwiched between the first plate portion and the intermediate plate portion and is disposed over an entire periphery of a peripheral edge of a combustion chamber hole. The shim includes a gradually changing portion. The gradually changing portion has a thickness in the hole axis direction that becomes thicker with a separation from the peripheral edge of the combustion chamber hole.

9 Claims, 8 Drawing Sheets

(58) Field of Classification Search
USPC .................................. 277/593, 594, 595
See application file for complete search history.

(56) References Cited

U.S. PATENT DOCUMENTS

| | | | |
|---|---|---|---|
| 5,895,054 A | 4/1999 | Miyaoh et al. | |
| 5,927,724 A * | 7/1999 | Maschmann | F16J 15/0825 |
| | | | 277/593 |
| 6,135,459 A * | 10/2000 | Hiramatsu | F16J 15/0818 |
| | | | 277/593 |
| 6,148,516 A * | 11/2000 | Diez | B21K 23/00 |
| | | | 29/888.3 |
| 6,315,303 B1 * | 11/2001 | Erb | F16J 15/0825 |
| | | | 277/593 |
| 6,499,743 B2 * | 12/2002 | Sadowski | F16J 15/0825 |
| | | | 277/593 |
| 7,909,337 B2 * | 3/2011 | Ueta | F16J 15/0825 |
| | | | 277/593 |
| 8,016,296 B2 * | 9/2011 | Imai | F16J 15/0825 |
| | | | 277/593 |
| 9,239,112 B2 * | 1/2016 | Uchida | F16J 15/0825 |
| 9,476,382 B2 * | 10/2016 | Foster | F16J 15/0825 |
| 10,359,003 B2 * | 7/2019 | Haberer | F02F 11/002 |
| 2002/0180161 A1 | 12/2002 | Werz et al. | |
| 2005/0179210 A1 * | 8/2005 | Sueda | F16J 15/0825 |
| | | | 277/592 |
| 2007/0090607 A1 * | 4/2007 | Ueta | F16J 15/0825 |
| | | | 277/593 |
| 2007/0090608 A1 * | 4/2007 | Ueta | F16J 15/0818 |
| | | | 277/593 |
| 2010/0025940 A1 * | 2/2010 | Uchida | F16J 15/0825 |
| | | | 277/593 |
| 2014/0042705 A1 * | 2/2014 | Foster | F02F 11/002 |
| | | | 277/592 |

FOREIGN PATENT DOCUMENTS

| | | |
|---|---|---|
| JP | 6-337069 A | 12/1994 |
| JP | H10-038088 A | 2/1998 |
| JP | 2001-295930 A | 10/2001 |
| JP | 2001-295937 A | 10/2001 |
| JP | 2012-007645 A | 1/2012 |
| JP | 2012-036967 A | 2/2012 |
| JP | 2020-034035 A | 3/2020 |

* cited by examiner

GASKET

CROSS REFERENCE TO RELATED APPLICATIONS

This application is a National Stage of International Application No. PCT/JP2022/018568 filed Apr. 22, 2022, claiming priority based on Japanese Patent Application No. 2021-084492 filed May 19, 2021.

BACKGROUND

Japanese Patent Laying-Open No. 2001-295930 (PTL 1) is a prior art document disclosing a gasket. The gasket described in PTL 1 includes a plate and a shim. A combustion chamber hole is bored into the plate. The shim is fixed to an edge portion of the plate surrounding the combustion chamber hole. The cross-section of the shim is tapered with a thickness on an inner peripheral side surrounding the combustion chamber hole that becomes thick and a thickness on an outer peripheral side that becomes thin. A primary seal portion is formed, where a surface pressure locally increases surrounding the combustion chamber hole, by the shim and the edge portion of the plate.

CITATION LIST

Patent Literature

PTL 1: Japanese Patent Laying-Open No. 2001-295930

SUMMARY

Technical Problem

In the case where gas within the combustion chamber hole is over-compressed following an increase in an output of an engine, a portion of a cylinder head adjacent to the combustion chamber hole thermally expands so as to protrude to the combustion chamber hole side. In the surrounding of the combustion chamber hole where the shim of the gasket is provided, in the case where the gasket is pressed by the thermal expansion of the cylinder head, and a contact surface pressure between the cylinder head and the gasket is excessively increased and an indentation is formed on the cylinder head, adhesion between the cylinder head and the gasket cannot be maintained, and there is a possibly that the sealability of the gasket decreases.

The present disclosure has been made to solve the above-stated problem, and has an objective of providing a gasket that can suppress a decrease in sealability due to an excessive increase in a contact surface pressure between a cylinder head and the gasket.

Solution to Problem

A gasket based on a first aspect of the present disclosure is sandwiched between a cylinder head and a cylinder block and shares, with the cylinder block, a combustion chamber hole extending in a hole axis direction. The gasket includes a first plate portion, a second plate portion, an intermediate plate portion, and a shim. The first plate portion abuts against the cylinder head and has a substantially constant plate thickness. The second plate portion abuts against the cylinder block and has a substantially constant plate thickness. The intermediate plate portion is sandwiched between the first plate portion and the second plate portion and has a substantially constant plate thickness. The shim is sandwiched between the first plate portion and the intermediate plate portion and is disposed over an entire periphery of a peripheral edge of the combustion chamber hole. The shim includes a gradually changing portion. The gradually changing portion has a thickness in the hole axis direction that becomes thicker with a separation from the peripheral edge of the combustion chamber hole.

Advantageous Effects

According to the present disclosure, a decrease in sealability of a gasket by an excess increase of a contact surface pressure between a cylinder head and the gasket can be suppressed.

DESCRIPTION OF EMBODIMENTS

Figure 1:
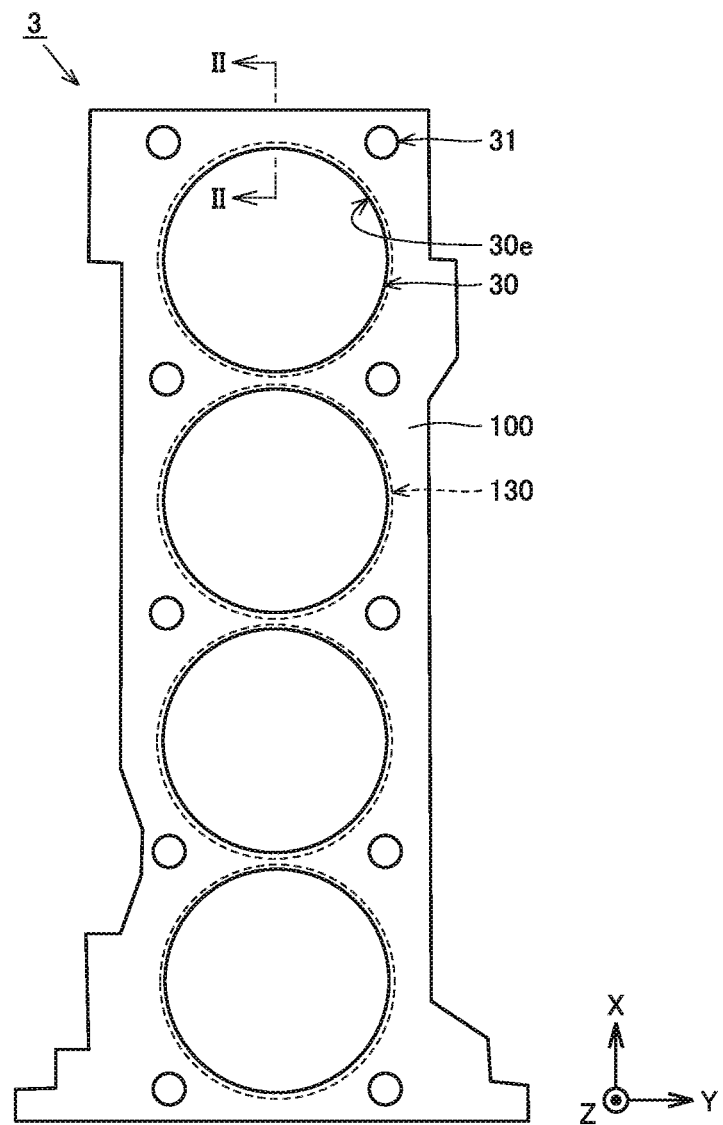
FIG. 1 is an upper surface view showing a configuration of a gasket relating to Embodiment 1 of the present disclosure.

Hereinafter, a gasket relating to each embodiment of the present disclosure will be described with reference to the figures. In the following descriptions of the embodiments, the same reference numerals are attached to same or corresponding portions within the figures, and descriptions of these portions are not repeated. Note that, in the figures, a direction perpendicular to the hole axis direction of the combustion chamber hole and in which a plurality of the combustion chamber holes are arranged side by side is set as an X-axis direction, a direction perpendicular to the hole axis direction of the combustion chamber hole and intersecting a direction in which a plurality of the combustion chamber holes are arranged side by side is set as a Y-axis direction, and the hole axis direction of the combustion chamber hole is set as a Z-axis direction.

Embodiment 1

Figure 2:
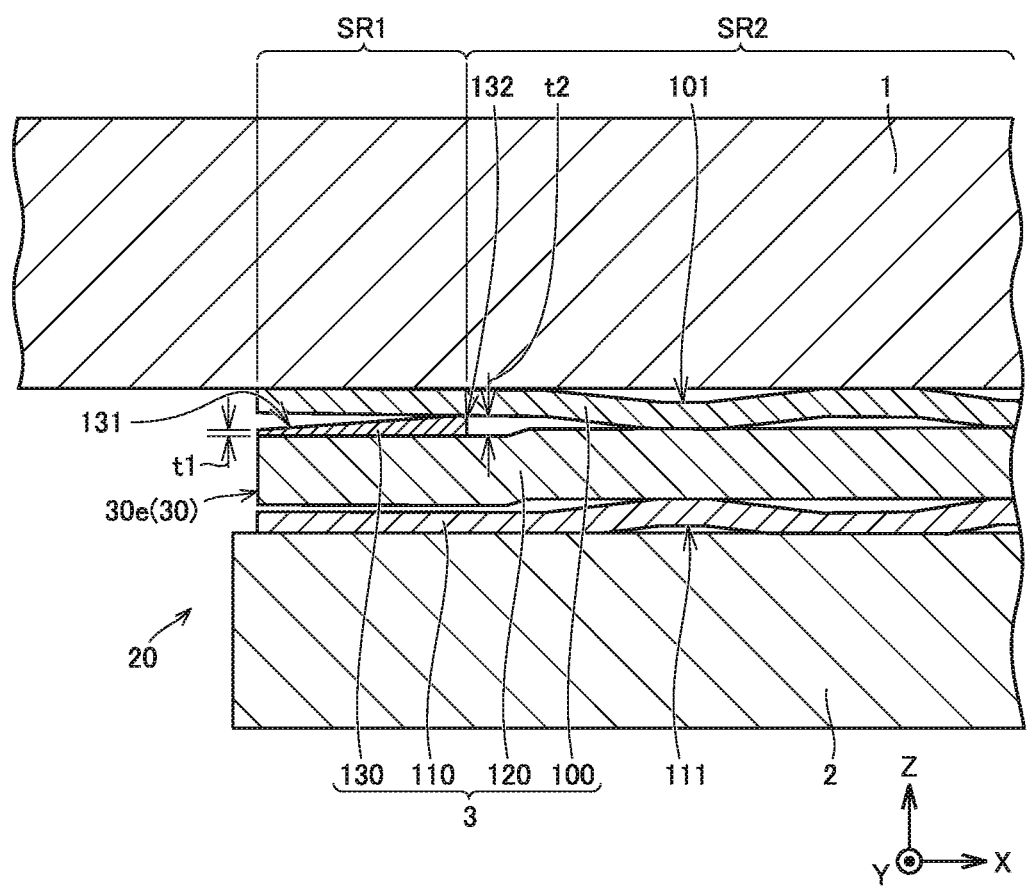
FIG. 2 is a cross-sectional view in which the gasket of FIG. 1 is viewed in an II-II line arrow direction.

FIG. 1 is an upper surface view showing a configuration of a gasket relating to Embodiment 1 of the present disclosure. FIG. 2 is a cross-sectional view in which the gasket of FIG. 1 is viewed in an II-II line arrow direction. Note that, in FIG. 2, a cylinder head and a cylinder block are illustrated, for ease of understanding of the positional relationship of the gasket.

As shown in FIG. 1 and FIG. 2, a gasket 3 relating to Embodiment 1 of the present disclosure is a member that constitutes a vehicle engine. As shown in FIG. 2, the gasket 3 is sandwiched between a cylinder head 1 and a cylinder block 2.

The cylinder head 1 is fixed to the cylinder block 2 by sandwiching the gasket 3 therebetween. The cylinder head 1 is, for example, made of aluminum.

A combustion chamber hole 20 is provided in the cylinder block 2. The combustion chamber hole 20 extends in a hole axis direction (Z-axis direction). Four combustion chamber holes, which are not illustrated, are disposed side by side in the X-axis direction in the cylinder block 2. The cylinder block 2 is, for example, made of aluminum or cast iron.

As shown in FIG. 1, the gasket 3 shares, with the cylinder block 2, a combustion chamber hole 30 that extends in the hole axis direction (Z-axis direction). In the present embodiment, four of the combustion chamber holes 30 are disposed side by side in the X-axis direction in the gasket 3.

Through holes 31 are provided in the gasket 3. A plurality of the through holes 31 are provided with the intention of both fixing the cylinder head 1 and the cylinder block 2 by having bolts inserted through the through holes 31, and cooling the surroundings of the combustion chamber hole 30 by having a coolant flow through.

As shown in FIG. 1 and FIG. 2, the gasket 3 relating to Embodiment 1 of the present disclosure includes a first plate portion 100, a second plate portion 110, an intermediate plate portion 120, and a shim 130.

As shown in FIG. 2, the first plate portion 100 is a plate shaped member provided on the cylinder head 1 side. The first plate portion 100 is, for example, made of stainless steel.

The first plate portion 100 has a convex portion 101 that protrudes to the cylinder block 2 side so as to surround the periphery of the combustion chamber hole 30. The convex portion 101 is provided at a position separated from a peripheral edge 30e of the combustion chamber hole 30.

The first plate portion 100 abuts against the cylinder head 1. Specifically, the first plate portion 100 has a surface of a portion other than the convex portion 101 on the cylinder head 1 side that abuts against the cylinder head 1.

The first plate portion 100 abuts against the intermediate plate portion 120 and the shim 130 on the cylinder block 2 side. Specifically, in the first plate portion 100, a surface of the convex portion 101 on the cylinder block 2 side abuts against the intermediate plate portion 120, and a surface of a portion near the peripheral edge 30e of the combustion chamber hole 30 on the cylinder block 2 side abuts against the shim 130.

The first plate portion 100 has a substantially constant plate thickness. Note that, "substantially constant" related to a plate thickness of the present embodiment has a meaning that includes a variation in a plate thickness by a small machining tolerance compared to a change in a plate thickness of a gradually changing portion, which will be described below.

The second plate portion 110 is a plate shaped member provided on the cylinder block 2 side. The second plate portion 110 is, for example, made of stainless steel.

The second plate portion 110 has a convex portion 111 that protrudes to the cylinder head 1 side so as to surround the periphery of the combustion chamber hole 30. The convex portion 111 is provided at a position separated from the peripheral edge 30e of the combustion chamber hole 30.

The second plate portion 110 abuts against the cylinder block 2. Specifically, the second plate portion 110 has a surface of a portion other than the convex portion 111 on the cylinder block 2 side that abuts against the cylinder block 2.

The second plate portion 110 abuts against the intermediate plate portion 120 on the cylinder head 1 side. Specifically, a surface of the convex portion 111 on the cylinder head 1 side abuts against the intermediate plate portion 120.

The second plate portion 110 has a substantially constant plate thickness. The second plate portion 110 in the present embodiment has a plate thickness substantially the same as that of the first plate portion 100.

The intermediate plate portion 120 is a plate shaped member sandwiched between the first plate portion 100 and the second plate portion 110. The intermediate plate portion 120 is, for example, made of stainless steel.

The intermediate plate portion 120 is displaced to the cylinder block 2 side, at the portion that abuts against the shim 130. In this way, a gap between the first plate portion 100 and the intermediate plate portion 120 becomes larger with respect to a gap between the second plate portion 110 and the intermediate plate portion 120, in the Z-axis direction, at the portion of the combustion chamber hole 30 near the peripheral edge 30e.

The intermediate plate portion 120 has a substantially constant plate thickness.

The intermediate plate portion 120 in the present embodiment has a thicker plate thickness compared to each of the first plate portion 100 and the second plate portion 110.

As shown in FIG. 1 and FIG. 2, the shim 130 is a plate shaped member having an annular shape. The shim 130 is, for example, made of stainless steel. The shim 130 is disposed over the entire periphery of the peripheral edge 30e of the combustion chamber hole 30.

The shim 130 is sandwiched between the first plate portion 100 and the intermediate plate portion 120. In this way, the first plate portion 100 can be interposed between the shim 130 and the cylinder head 1. By having the shim 130 disposed in such a way, a contact surface pressure can be suppressed from locally increasing, while increasing a contact surface pressure between the gasket 3 and the cylinder head 1. In the case where the shim 130 is sandwiched between the second plate portion 110 and the intermediate plate portion 120, the effect of increasing a contact surface pressure between the gasket 3 and the cylinder head 1 becomes difficult to obtain.

Figure 3:
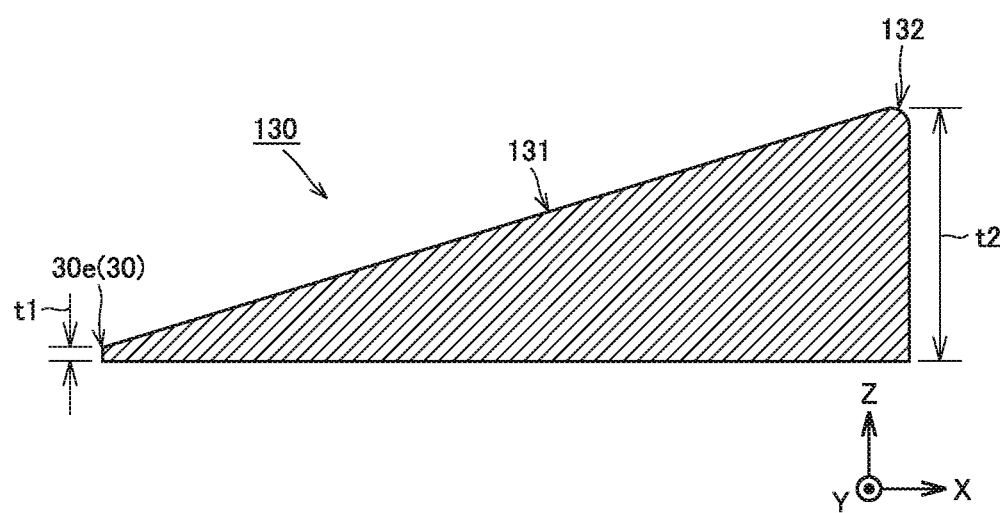
FIG. 3 is a cross-sectional view showing a configuration of a shim included in the gasket relating to Embodiment 1 of the present disclosure.

FIG. 3 is a cross-sectional view showing a configuration of the shim included in the gasket relating to Embodiment 1 of the present disclosure. As shown in FIG. 2 and FIG. 3, the shim 130 includes a gradually changing portion 131 with a thickness in the hole axis direction (Z-axis direction) that becomes thicker with a separation from the peripheral edge 30e of the combustion chamber hole 30. Specifically, the gradually changing portion 131 has a thickness t1 at an end portion on the peripheral edge 30e side, and has a thickness t2 at an end portion on the opposite side to the peripheral edge 30e. The thickness of the gradually changing portion 131 becomes gradually thicker from the thickness t1 to the thickness t2 with a separation from the peripheral edge 30e. The gradually changing portion 131 is adjacent to the combustion chamber hole 30.

The gradually changing portion 131 is provided over the entire periphery of the peripheral edge 30e of the combustion chamber hole 30. Since the shim 130 has an annular shape, the gradually changing portion 131 can be easily formed on the shim 130 by press machining or the like, compared to the case where the gradually changing portion is formed on the first plate portion, such as described below.

The surface of the gradually changing portion 131 on the cylinder block 2 side has a flat shape. In this way, the shim 130 makes surface contact with the intermediate plate portion 120.

The surface of the gradually changing portion 131 on the cylinder head 1 side is inclined linearly with respect to the surface of the gradually changing portion 131 on the cylinder block 2 side, when viewed in a peripheral direction of the combustion chamber hole 30. In a state where a portion of the cylinder head 1 adjacent to the combustion chamber hole 30 does not thermally expand so as to protrude to the gasket 3 side, a gap is formed in the Z-axis direction between the first plate portion 100 and the shim 130 in a portion near the peripheral edge 30e.

The shim 130 further includes a round edge portion 132. The round edge portion 132 is provided on an end of the shim 130 on an opposite side to the peripheral edge 30e side. In the present embodiment, the surface of each of the gradually changing portion 131 and the round edge portion 132 on the cylinder head 1 side is smoothly continuous. When the first plate portion 100 and the shim 130 abut against each other, since a contact surface pressure is dispersed by the round edge portion 132, a contact surface pressure between the first plate portion 100 and the shim 130 can be suppressed from locally increasing. As a result of this, a contact surface pressure between the gasket 3 and the cylinder head 1 in the periphery of the round edge portion 132 can be suppressed from locally increasing.

Note that, while the shim 130 in the present embodiment has a trapezoid shape in which the plate thickness in the Z-axis direction gradually changes, when viewed in a peripheral direction of the combustion chamber hole 30, it is not limited to this configuration. Specifically, the shim 130 may include the gradually changing portion 131 with a portion having a plate thickness that is substantially constant, when viewed in a peripheral direction of the combustion chamber hole 30.

As shown in FIG. 2, the gasket 3 in the present embodiment includes a first seal region SR1 and a second seal region SR2.

The first seal region SR1 is a region in which the first plate portion 100, the second plate portion 110, the intermediate plate portion 120, and the shim 130 are stacked in the Z-axis direction. The first seal region SR1 is adjacent to the combustion chamber hole 30.

The second seal region SR2 is a region in which the first plate portion 100, the second plate portion 110, and the intermediate plate portion 120 are stacked in the Z-axis direction. The second seal region SR2 is disposed on the outer periphery of the first seal region SR1 when viewed in the combustion chamber hole 30.

In the first seal region SR1, by having the shim 130 disposed in addition to each of the first plate portion 100, the second plate portion 110, and the intermediate plate portion 120, a contact surface pressure between each of the cylinder head 1 and cylinder block 2 and the gasket 3 increases more than this contact surface pressure in the second seal region SR2.

Figure 4:
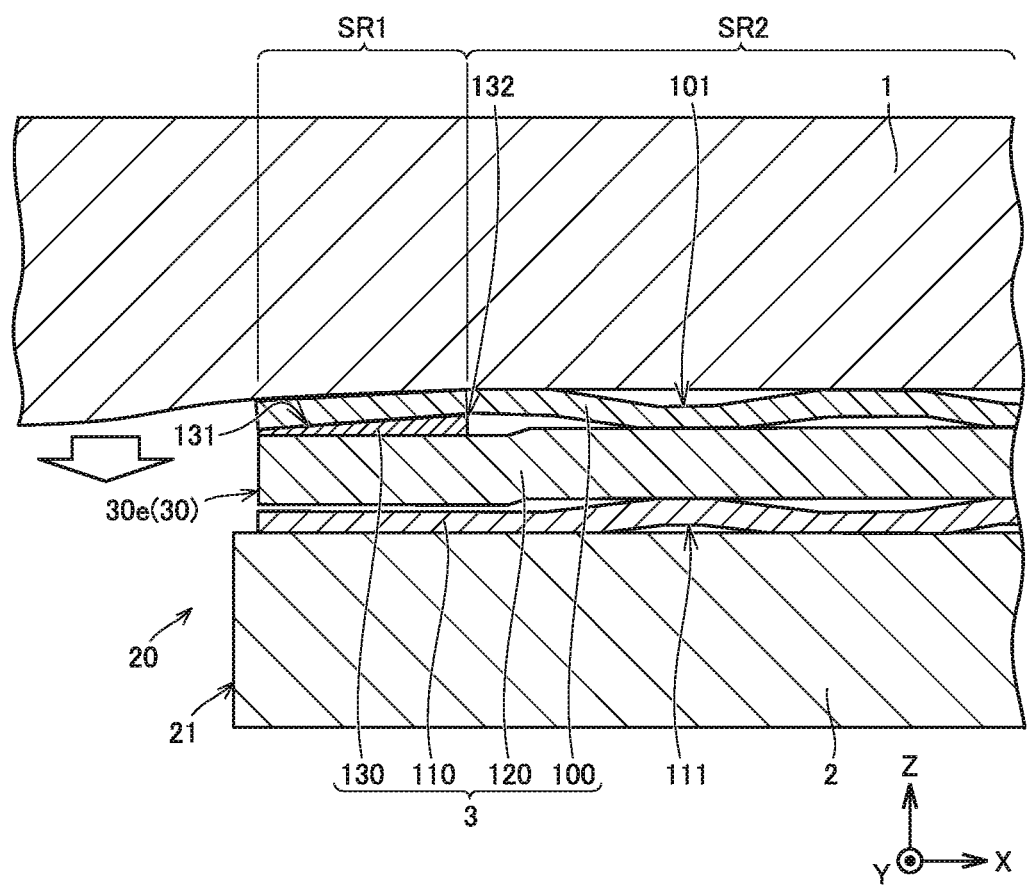
FIG. 4 is a cross-sectional view showing a state where a cylinder head is thermally expanded in the gasket relating to Embodiment 1 of the present disclosure.

FIG. 4 is a cross-sectional view showing a state where the cylinder head is thermally expanded in the gasket relating to Embodiment 1 of the present disclosure.

The cylinder head 1 is at a high temperature by combustion of fuel gas within the combustion chamber hole 30, and thermally expands. In this way, the cylinder head 1 deforms so as to protrude to the combustion chamber hole 30 side at a portion adjacent to the combustion chamber hole 30. Namely, as shown in FIG. 4, the cylinder head 1 deforms by thermally expanding in the arrow direction within FIG. 4.

The first plate portion 100 deforms along with the deformation by thermal expansion of the cylinder head 1. Specifically, a portion of the first plate portion 100 near the peripheral edge 30e deforms to the cylinder block 2 side. The gap between the first plate portion 100 and the shim 130 in a portion near the peripheral edge 30e disappears, in accordance with the deformation of the first plate portion 100. In this way, the gasket 3 is configured to enable deformation following the deformation by thermal expansion of the cylinder head 1.

Here, a gasket relating to a comparative example in the case where a plate thickness of the shim is substantially constant will be described. Note that, in the gasket relating to the present comparative example, descriptions of configurations that are the same as those of the gasket 3 relating to Embodiment 1 of the present disclosure are not repeated.

Figure 5:
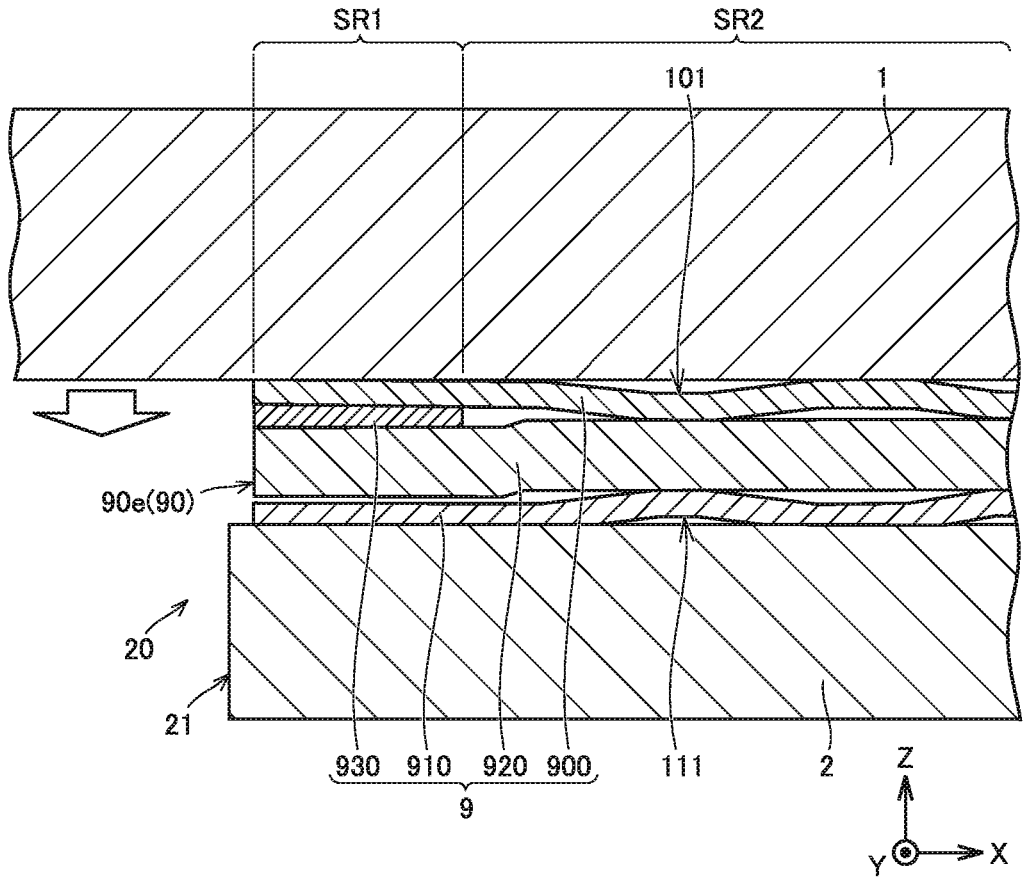
FIG. 5 is a cross-sectional view showing a configuration of a gasket relating to a comparative example.

FIG. 5 is a cross-sectional view showing a configuration of the gasket relating to the comparative example. As shown in FIG. 5, a combustion chamber hole 90 is provided in a gasket 9 relating to the comparative example. The gasket 9 includes a first plate portion 900, a second plate portion 910, an intermediate plate portion 920, and a shim 930. The shim 930 has a substantially constant plate thickness.

In the case where the cylinder head 1 deforms to the combustion chamber hole 90 side by thermal expansion, by having gas within the combustion chamber hole 90 overcompressed, a contact surface pressure between the cylinder head 1 and the vicinity of a peripheral edge 90e of the combustion chamber hole 90 of the gasket 9 locally increases. In the case where this locally increasing contact surface pressure exceeds a threshold, an indentation is formed in the cylinder head 1.

Figure 6:
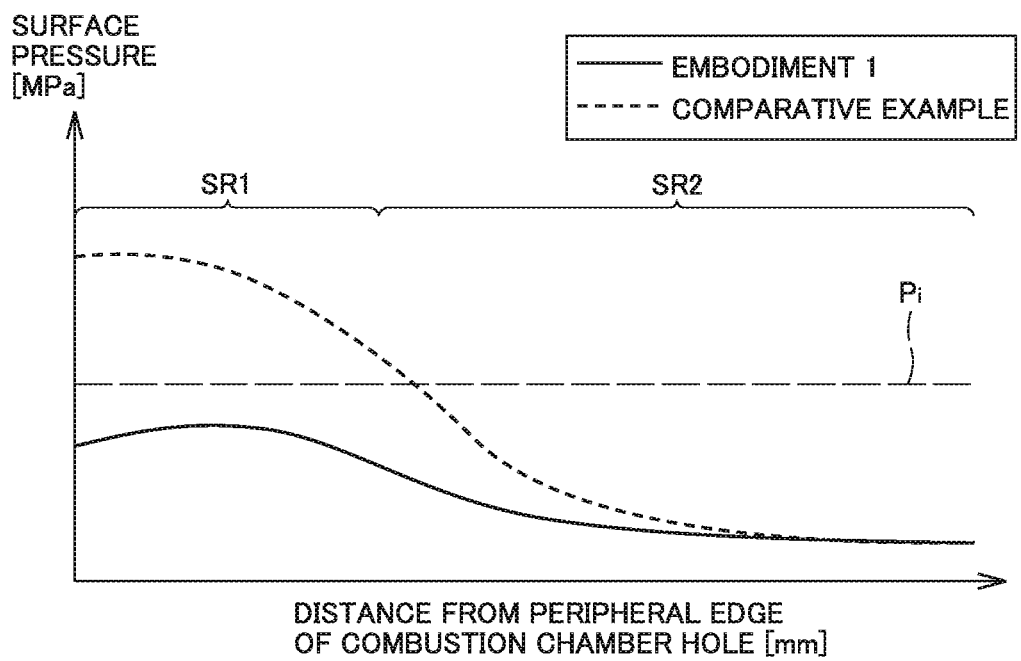
FIG. 6 is a graph showing a change in a surface pressure that the gasket exerts on the cylinder head with respect to a distance from a peripheral edge of a combustion chamber hole in Embodiment 1 and the comparative example of the present disclosure.

FIG. 6 is a graph showing a change in a contact surface pressure between the gasket and the cylinder head with respect to a distance from the peripheral edge of the combustion chamber hole in Embodiment 1 and the comparative example of the present disclosure. In FIG. 6, a contact surface pressure (MPa) between the gasket and the cylinder head is shown on the vertical axis, and a distance (mm) from the peripheral edge of the combustion chamber hole is shown on the horizontal axis.

Figure 7:
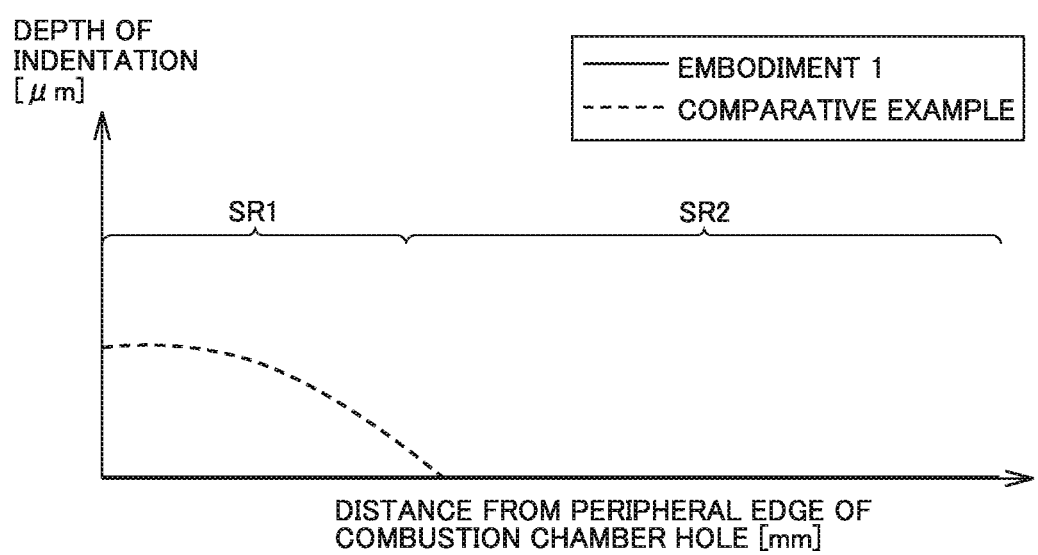
FIG. 7 is a graph showing an indentation amount of the cylinder head with respect to a distance from a peripheral edge of a combustion chamber hole in Embodiment 1 and the comparative example of the present disclosure.

FIG. 7 is a graph showing a relationship between a distance from the peripheral edge of the combustion chamber hole and a depth of an indentation formed in the cylinder head in Embodiment 1 and the comparative example of the present disclosure. In FIG. 7, a depth (μm) of an indentation in the Z-axis direction formed in the cylinder head 1 is shown on the vertical axis, and a distance (mm) from the peripheral edge of the combustion chamber hole is shown on the horizontal axis.

As stated above, when a contact surface pressure between the cylinder head 1 and the gasket exceeds a threshold, an indentation is formed in the cylinder head 1. As shown in FIG. 6, an indentation occurrence surface pressure, which is a threshold of a contact surface pressure where an indentation is formed in the cylinder head 1, is $P_i$.

In the gasket 9 relating to the comparative example, since the shim 930 has a substantially constant plate thickness, a contact surface pressure between the cylinder head 1 and the gasket 9 exceeds the indentation occurrence surface pressure $P_i$, on the entire region of the first seal region SR1 and on a portion of the second seal region SR2 adjacent to the first seal region SR1.

As shown in FIG. 7, in the cylinder head 1 relating to the comparative example, an indentation is formed on the entire region of the first seal region SR1 and on a portion of the second seal region SR2 adjacent to the first seal region SR1, by a contact surface pressure exceeding the indentation occurrence surface pressure $P_i$. The indentation is deepest in a vicinity of the peripheral edge 90e of the combustion chamber hole 90, and becomes shallower with a separation from the vicinity of the peripheral edge 90e of the combustion chamber hole 90. When an indentation is formed on the cylinder head 1, adhesion between the cylinder head 1 and the gasket 9 cannot be maintained, and the sealability of the gasket 9 decreases.

On the other hand, as shown in FIG. 2, FIG. 4, and FIG. 6, in the gasket 3 in the present embodiment, since the shim 130 includes the gradually changing portion 131, and the gasket 3 is configured to enable deformation following the deformation by thermal expansion of the cylinder head 1, a contact surface pressure between the cylinder head 1 and a vicinity of the peripheral edge 30e of the combustion chamber hole 30 of the gasket 3 can be suppressed from locally increasing. As a result of this, a contact surface pressure between the cylinder head 1 and the gasket 3 becomes the indentation occurrence surface pressure $P_i$ or less, on the entire region of the first seal region SR1 and on the entire region of the second seal region SR2.

As shown in FIG. 7, by having a contact surface pressure between the cylinder head 1 and the gasket 3 maintained at the indentation occurrence surface pressure $P_i$ or less, an indentation is not formed in the cylinder head 1. As a result of this, the sealability of the gasket 3 can be maintained, by maintaining adhesion between the cylinder head 1 and the gasket 3.

In the gasket 3 relating to Embodiment 1 of the present disclosure, the shim 130 can suppress an excessive increase in a contact surface pressure between the cylinder head 1 and the gasket 3, by including the gradually changing portion 131 that becomes thicker with a separation from the peripheral edge 30e of the combustion chamber hole 30. Consequently, since an indentation formed on the cylinder head 1 can be suppressed, the sealability of the gasket 3 can be maintained.

In the gasket 3 relating to Embodiment 1 of the present disclosure, since the shim 130 can have a simple structure, by having a surface of the gradually changing portion 131 on the cylinder head 1 side inclined linearly when viewed in a peripheral direction of the combustion chamber hole 30, the gasket 3 can be manufactured at low cost.

Hereinafter, gaskets relating to modified examples of Embodiment 1 of the present disclosure will be described. Since the gaskets relating to the following modified examples are different to the gasket 3 relating to Embodiment 1 of the present disclosure for the configuration of the shim, descriptions of configurations that are the same as those of the gasket 3 relating to Embodiment 1 of the present disclosure are not repeated.

Figure 8:
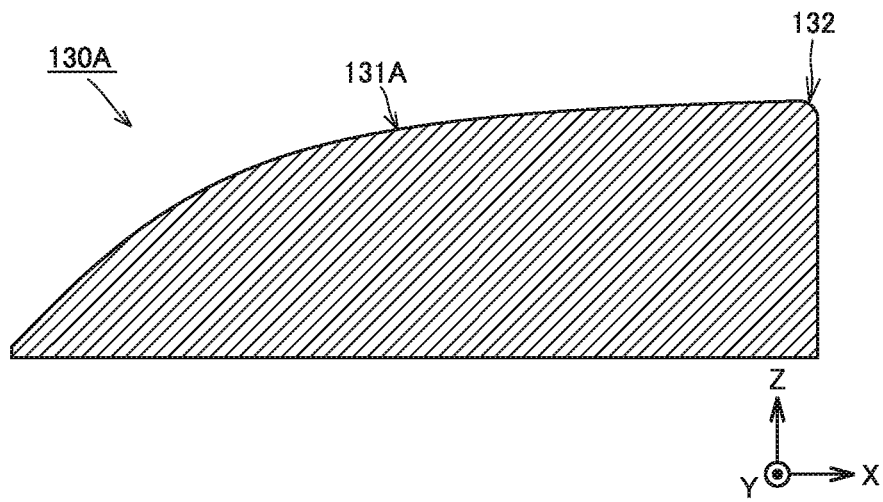
FIG. 8 is a cross-sectional view showing a configuration of a shim included in a gasket relating to a first modified example of Embodiment 1 of the present disclosure.

FIG. 8 is a cross-sectional view showing a configuration of a shim included in a gasket relating to a first modified example of Embodiment 1 of the present disclosure. As shown in FIG. 8, in a shim 130A included in the gasket relating to the first modified example of Embodiment 1 of the present disclosure, a surface of a gradually changing portion 131A on the cylinder head 1 side is inclined curvedly, when viewed in a peripheral direction of the combustion chamber hole 30. Specifically, a surface of the gradually changing portion 131A on the cylinder head 1 side is inclined curvedly in a convex shape on the cylinder head 1 side.

Figure 9:
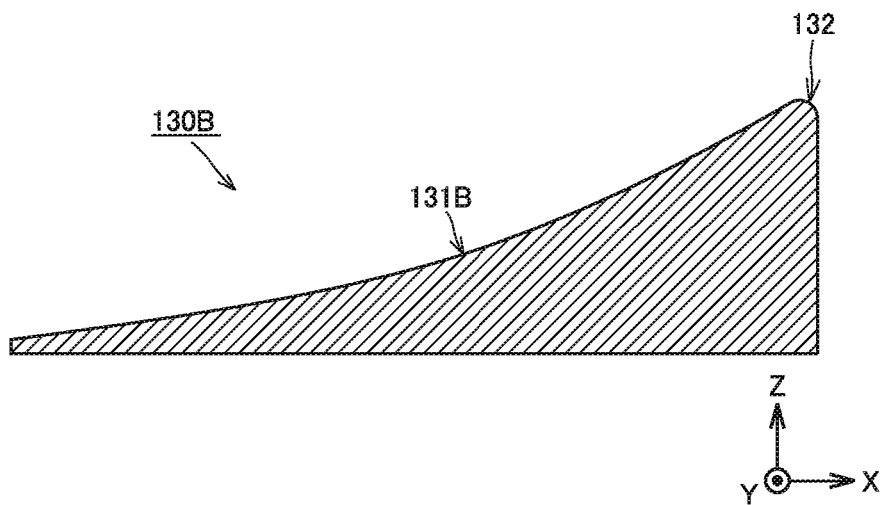
FIG. 9 is a cross-sectional view showing a configuration of a shim included in a gasket relating to a second modified example of Embodiment 1 of the present disclosure.

FIG. 9 is a cross-sectional view showing a configuration of a shim included in a gasket relating to a second modified example of Embodiment 1 of the present disclosure. As shown in FIG. 9, in a shim 130B included in the gasket relating to the second modified example of Embodiment 1 of the present disclosure, a surface of a gradually changing portion 131B on the cylinder head 1 side is inclined while curving in a convex shape on the cylinder block 2 side.

Figure 10:
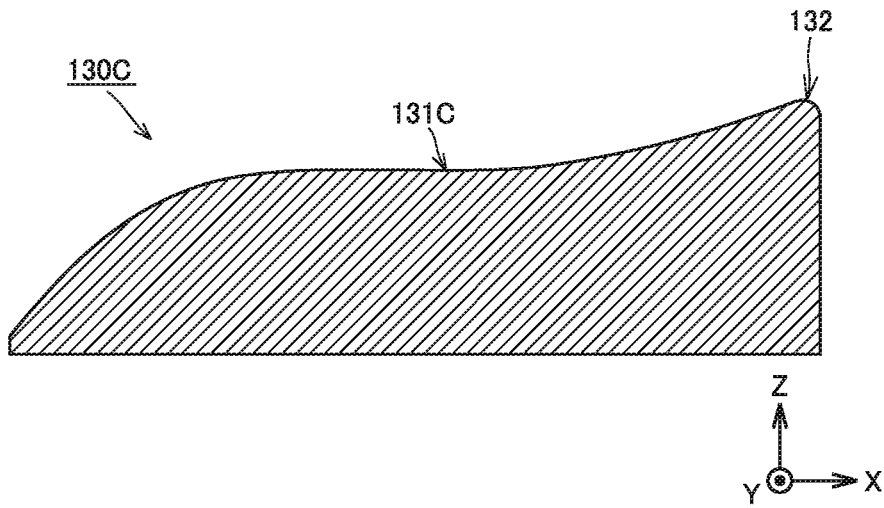
FIG. 10 is a cross-sectional view showing a configuration of a shim included in a gasket relating to a third modified example of Embodiment 1 of the present disclosure.

FIG. 10 is a cross-sectional view showing a configuration of a shim included in a gasket relating to a third modified example of Embodiment 1 of the present disclosure. As shown in FIG. 10, in a shim 130C included in the gasket relating to the third modified example of Embodiment 1 of the present disclosure, a surface of a gradually changing portion 131C on the cylinder head 1 side is inclined so that a portion curved in a convex shape on the cylinder head 1 side and a portion curved in a convex shape on the cylinder block 2 side are connected to each other, and so as to increase with a separation from the peripheral edge of the combustion chamber hole.

In the gaskets relating to the first to third modified examples of Embodiment 1 of the present disclosure, it becomes possible to further suppress a local increase in a contact surface pressure between the cylinder head 1 and the gasket, by the gradually changing portions 131A-131C of the shims 130A-130C having a shape corresponding to a distribution from the peripheral edge of the combustion chamber hole in a contact surface pressure between the cylinder head 1 and the gasket.

Embodiment 2

Hereinafter, a gasket relating to Embodiment 2 of the present disclosure will be described. Since the gasket relating to Embodiment 2 of the present disclosure is different to the gasket 3 relating to Embodiment 1 of the present disclosure for the configurations of the first plate portion and the shim, descriptions of configurations that are the same as those of the gasket 3 relating to Embodiment 1 of the present disclosure are not repeated.

Figure 11:
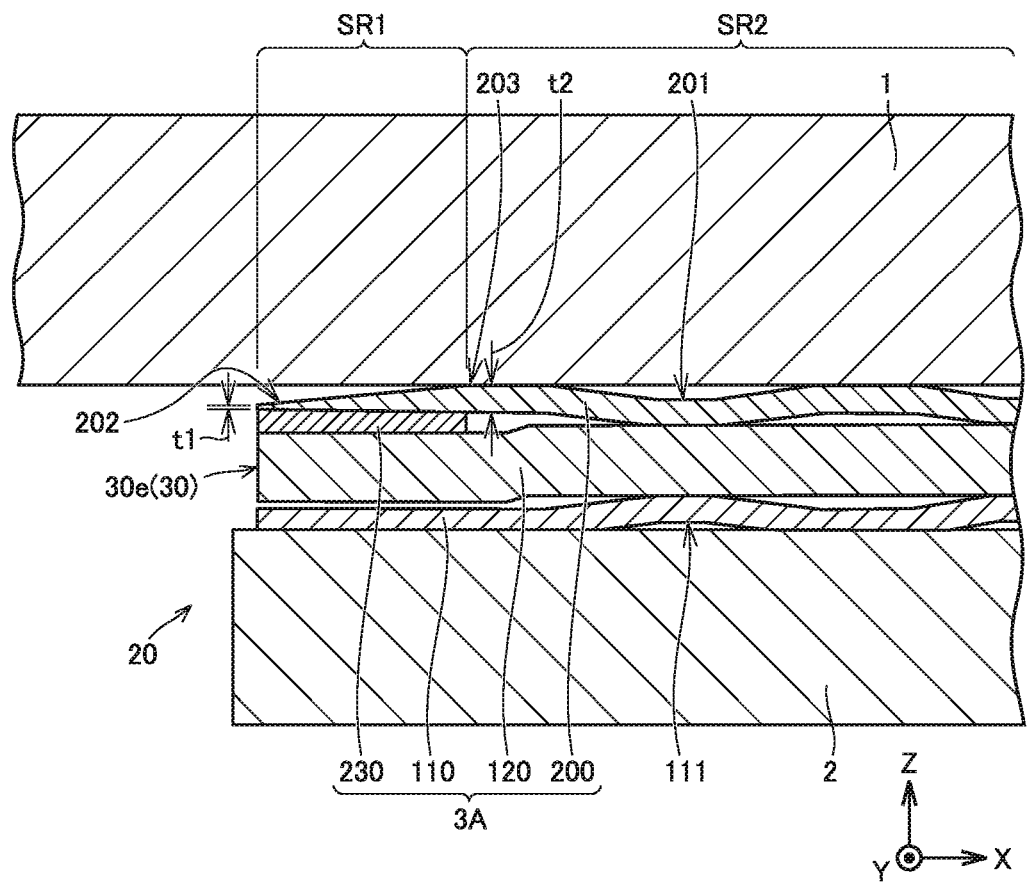
FIG. 11 is a cross-sectional view showing a configuration of a gasket relating to Embodiment 2 of the present disclosure.

FIG. 11 is a cross-sectional view showing a configuration of a gasket relating to Embodiment 2 of the present disclosure. As shown in FIG. 11, a gasket 3A relating to Embodiment 2 of the present disclosure includes a first plate portion 200, the second plate portion 110, the intermediate plate portion 120, and a shim 230.

The first plate portion 200 includes a convex portion 201 that protrudes to the cylinder block 2 side so as to surround the periphery of the combustion chamber hole 30. The convex portion 201 is provided at a position separated from the peripheral edge 30e of the combustion chamber hole 30.

The first plate portion 200 includes a gradually changing portion 202 with a thickness in a hole axis direction (Z-axis direction) that becomes thicker with a separation from the peripheral edge 30e of the combustion chamber hole 30.

The first plate portion 200 abuts against the cylinder head 1. Specifically, the first plate portion 200 has a surface of a portion other than the convex portion 201 and the gradually changing portion 202 on the cylinder head 1 side that abuts against the cylinder head 1.

The surface of the gradually changing portion 202 on the cylinder block 2 side has a flat shape. In this way, the gradually changing portion 202 makes surface contact with the shim 230.

The surface of the gradually changing portion 202 on the cylinder head 1 side is inclined linearly with respect to the surface of the gradually changing portion 202 on the cylinder block 2 side, when viewed in a peripheral direction of the combustion chamber hole 30. In a state where a portion of the cylinder head 1 adjacent to the combustion chamber hole 30 does not thermally expand so as to protrude to the gasket 3A side, a gap is formed in the Z-axis direction between the cylinder head 1 and the first plate portion 200 in a portion near the peripheral edge 30e. Note that, the surface of the gradually changing portion 202 on the cylinder head 1 side may be inclined curvedly with respect to the surface of the gradually changing portion 202 on the cylinder block 2 side, when viewed in a peripheral direction of the combustion chamber hole 30.

The first plate portion 200 further includes a round edge portion 203. The round edge portion 203 is provided adjacent to an end of the gradually changing portion 202 on an opposite side to the peripheral edge 30e side in the first plate portion 200.

The shim 230 is a plate shaped member having an annular shape. Specifically, the shim 230 is disposed over the entire periphery of the peripheral edge 30e of the combustion chamber hole 30, by having a substantially constant plate thickness.

The gap between the cylinder head 1 and the gradually changing portion 202 of the first plate portion 200 disappears, in accordance with a deformation by thermal expansion of the cylinder head 1. The gasket 3A relating to the present embodiment is configured to enable the influence of deformation by thermal expansion of the cylinder head 1 to be alleviated. As a result of this, a contact surface pressure between the cylinder head 1 and the gasket 3A becomes the indentation occurrence surface pressure $P_i$ or less, on the entire region of the first seal region SR1 and on the entire region of the second seal region SR2. By having a contact surface pressure between the cylinder head 1 and the gasket 3A maintained at the indentation occurrence surface pressure $P_i$ or less, an indentation is not formed in the cylinder head 1.

In the gasket 3A relating to Embodiment 2 of the present disclosure, an excessive increase in a contact surface pressure between the cylinder head 1 and the gasket 3A can be suppressed, by the first plate portion 200 including the gradually changing portion 202 that becomes thicker with a separation from the peripheral edge 30e of the combustion chamber hole 30. Consequently, since an indentation formed on the cylinder head 1 can be suppressed, the sealability of the gasket 3A can be maintained.

Note that, the embodiments currently disclosed are exemplifications for all points, and are not based on a limited interpretation. Therefore, the technical range of the present disclosure is not interpreted by only the above-stated embodiments. Moreover, all modifications within the meaning and scope equivalent to the scope of the claims are included. Combinable configurations may be combined with each other in the description of the above-stated embodiments.

REFERENCE SIGNS LIST

1 Cylinder head; 2 Cylinder block; 3, 3A, 9 Gasket; 20, 30, 90 Combustion chamber hole; 30e Peripheral edge; 31 Through hole; 100, 200, 900 First plate portion; 101, 111, 201 Convex portion; 110, 910 Second plate portion; 120, 920 Intermediate plate portion; 130, 130A, 130B, 130C, 230, 930 Shim; 131, 131A, 131B, 131C, 202 Gradually changing portion; 132, 203 Round edge portion; $P_i$ Indentation occurrence surface pressure; SR1 First seal region; SR2 Second seal region.

The invention claimed is:

1. A gasket sandwiched between a cylinder head and a cylinder block and sharing, with the cylinder block, a combustion chamber hole extending in a hole axis direction, the gasket comprising:
   a first plate portion abutting against the cylinder head and having a substantially constant plate thickness;
   a second plate portion abutting against the cylinder block and having a substantially constant plate thickness;
   an intermediate plate portion sandwiched between the first plate portion and the second plate portion and having a substantially constant plate thickness; and
   a shim sandwiched between the first plate portion and the intermediate plate portion and disposed over an entire periphery of a peripheral edge of the combustion chamber hole, wherein
   the shim includes a gradually changing portion with a thickness in the hole axis direction that becomes thicker with a separation from the peripheral edge of the combustion chamber hole, wherein
   the shim further includes a round edge portion that is provided on an end of the shim on an opposite side to the peripheral edge side of the combustion chamber hole, and
   a surface of the gradually changing portion and a surface of the round edge portion on the cylinder head side are both smooth and joined continuously to each other.

2. The gasket according to claim 1, wherein a surface of the gradually changing portion on the cylinder head side is inclined linearly when viewed in a peripheral direction of the combustion chamber hole.

3. The gasket according to claim 1, wherein a surface of the gradually changing portion on the cylinder head side is inclined curvedly when viewed in a peripheral direction of the combustion chamber hole.

4. The gasket according to claim 1, wherein
   a surface of the gradually changing portion on the cylinder block side has a flat shape which is able to make surface contact with the intermediate plate portion, and
   a surface of the gradually changing portion on the cylinder head side is inclined with respect to the surface of the gradually changing portion on the cylinder block side, when viewed in a peripheral direction of the combustion chamber hole.

5. The gasket according to claim 1, wherein the intermediate plate portion is displaced to the cylinder block side, at a portion that abuts against the shim.

6. A gasket sandwiched between a cylinder head and a cylinder block and sharing, with the cylinder block, a combustion chamber hole extending in a hole axis direction, the gasket comprising:
   a first plate portion abutting against the cylinder head;
   a second plate portion abutting against the cylinder block and having a substantially constant plate thickness;
   an intermediate plate portion sandwiched between the first plate portion and the second plate portion and having a substantially constant plate thickness; and
   a shim sandwiched between the first plate portion and the intermediate plate portion, disposed over an entire periphery of a peripheral edge of the combustion chamber hole, and having a substantially constant plate thickness, wherein the first plate portion includes a gradually changing portion with a plate thickness in the hole axis direction that becomes thicker with a separation from the peripheral edge of the combustion chamber hole.

7. The gasket according to claim 6, wherein a surface of the gradually changing portion on the cylinder block side has a flat shape which is able to make surface contact with the shim, and a surface of the gradually changing portion on the cylinder head side is inclined with respect to the surface of the gradually changing portion on the cylinder block side, when viewed in a peripheral direction of the combustion chamber hole.

8. The gasket according to claim 6, wherein the intermediate plate portion is displaced to the cylinder block side, at a portion that abuts against the shim.

9. The gasket according to claim 6, wherein the first plate portion further includes a round edge portion, and the round edge portion is provided to an end of the first plate portion on an opposite side to the peripheral edge side of the combustion chamber hole.

\* \* \* \* \*